V. H. FRANCIS.
FISHING TOOL.
APPLICATION FILED NOV. 21, 1918.
1,324,500. Patented Dec. 9, 1919.
FIG. 1     FIG. 3     FIG. 4
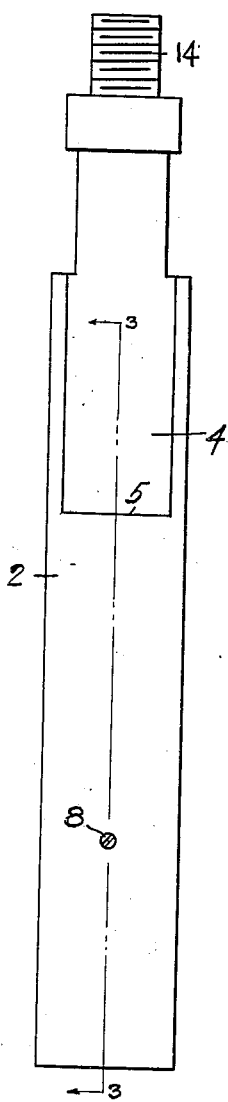
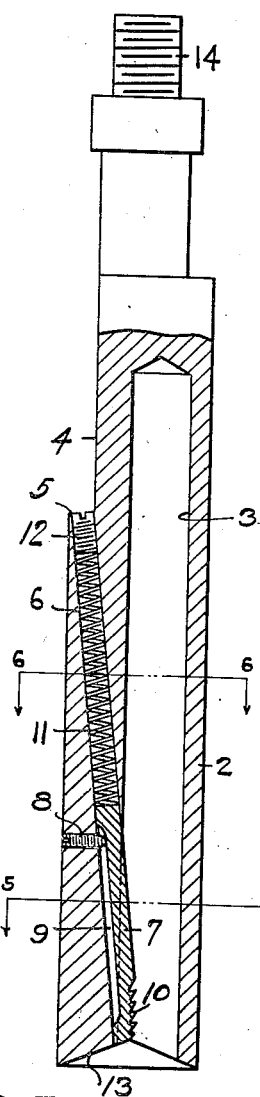
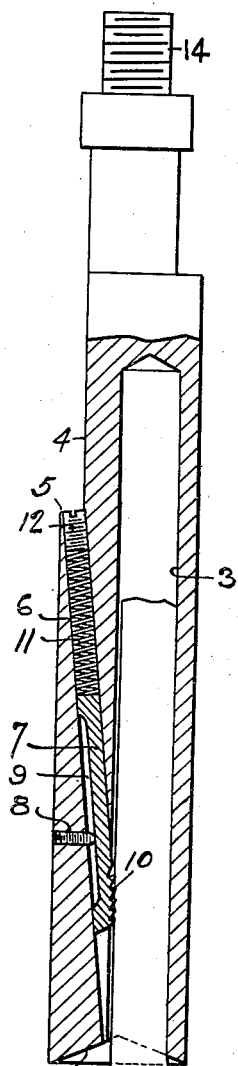
FIG. 2     FIG. 5     FIG. 6
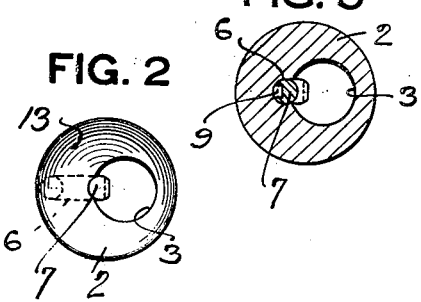
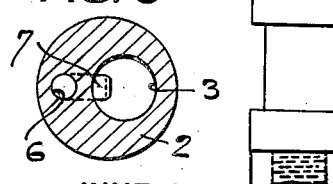
INVENTOR
Vincent H. Francis
By Kay, Totten & Powell
attys

UNITED STATES PATENT OFFICE.

VINCENT H. FRANCIS, OF DRUMRIGHT, OKLAHOMA, ASSIGNOR TO FRICK-REID SUPPLY COMPANY, OF PITTSBURGH, PENNSYLVANIA, A CORPORATION OF PENNSYLVANIA.

FISHING-TOOL.

1,324,500.  Specification of Letters Patent.  Patented Dec. 9, 1919.

Application filed November 21, 1918. Serial No. 263,505.

*To all whom it may concern:*

Be it known that I, VINCENT H. FRANCIS, a citizen of the United States, and resident of Drumright, in the county of Creek and State of Oklahoma, have invented a new and useful Improvement in Fishing-Tools; and I do hereby declare the following to be a full, clear, and exact description thereof.

My invention relates to fishing tools, and more especially to a tool for use in fishing for broken pump or sucker rods in oil or like deep wells.

The object of my invention is to provide a simple and durable form of fishing tool which will grip the rod very securely, and one which dispenses with the use of spring slips, which are liable to break and fall in the well, thereby often causing the tubing to be pulled.

To these ends my invention comprises the novel features hereinafter set forth and claimed.

In the accompanying drawing, Figure 1 is an exterior view of my improved fishing tool; Fig. 2 is a bottom view; Fig. 3 is a vertical section on the line 3—3, Fig. 1, showing the tool with the parts in normal position; Fig. 4 is a like view showing the tool in act of gripping the broken sucker rod; Fig. 5 is a cross section on the line 5—5, Fig. 3; and Fig. 6 is a cross section on the line 6—6, Fig. 3.

In the drawing, the numeral 2 designates the main body or socket of the tool, which has the bore 3 formed therein eccentric to the axial line of said body portion which provides a thick wall portion to the socket, said bore being of a size to admit more or less snugly a sucker or pump-rod of standard size.

The body portion 2 is provided with the offset 4 forming the shoulder 5, and drilled in said shoulder and extending into the thick body wall of the tool at an angle to the axial line of the tool is the passage 6 communicating at its lower end with the bore 3. Within the passage 6 is inserted the slip 7, said slip being guided therein by the screw 8, which engages a longitudinal groove 9 formed in said slip. In this manner the slip is held from falling from the passage 6.

On the lower end of the slip 7 are the teeth 10, which give said slip its gripping action, as will more fully hereinafter appear.

The slip 7 is yieldingly mounted in the passage 6, due to the action of the spring 11, which bears against the upper end of said slip, said spring being confined between said slip and the plug 12 secured into the upper end of the passage 6.

As indicated in Fig. 3, the normal position of the slip 7 is such that its lower end extends down to the lower end of the bore 3 and projects within said bore.

The lower end of the body portion 2 is concaved, as at 13, so as to facilitate the directing or guiding of the upper end of the rod to be extracted into the bore 3.

The upper end of the tool is provided with the threaded portion 14 for connecting said tool to the rod or other connection leading to the top of the well.

When in operation the tool is lowered until it meets the upper end of the broken sucker or pump-rod, whereupon, by downward pressure applied to the tool the upper end of the sucker-rod will be forced up into the bore 3, the slip 7 yielding and permitting the sucker-rod to pass over the teeth 10 of said slip. As soon, however, as lifting force is applied to the tool, the teeth 10 will tightly grip the rod, and the harder the pull the tighter the grip of the slip.

In order to release the rod, the operator presses down on the tool and with a nail or some light steel instrument, the slip is pressed back up against the tension spring until the rod is released, and then the tool is lifted from the rod.

My improved fishing tool permits of the catching of any standard size sucker-rod without making any change in the slips, while with the tools now ordinarily in use it is necessary to change sockets or slips to catch the different sizes of rods, and if the rod is worn on the broken end where the socket is to catch, they often fail to take hold. Furthermore, in the tools heretofore employed, the springs are directly over the slips, and when the socket is in use the whole weight of the rods above the socket is on the spring, often breaking the spring and causing trouble. In my fishing tool the socket has no weight on the spring as the spring is only used to keep an even pressure on the slip.

Another important feature of my invention is that the slips are not in any way exposed and the parts are so confined that nothing but the smooth outer face of the tool comes in contact with the walls of the well, and the socket does not have to be taken apart to remove the rods and there is no chance of losing the spring or slip.

What I claim is:—

1. In a fishing tool, the combination of a socket having a bore disposed eccentric to its axial plane so as to provide a thickened wall portion to the socket, a passage formed in said thickened wall portion and forming for a portion of its length a groove in said bore extending to the open end thereof, and a slip slidable in said groove and adapted to project into said bore.

2. In a fishing tool the combination of a socket having a bore disposed eccentric to its axial plane to provide a thickened wall portion to the socket, a passage formed in said thickened wall portion disposed at an angle to and intersecting the inner wall of said bore and forming a groove therein extending from its point of intersection to the open end of said bore, and a slip slidable in said groove adapted to project into said first bore.

3. In a fishing tool, the combination of a socket having a bore formed therein and a passage arranged at an angle to the axial line of said socket and intersecting the wall of said bore and forming a groove in the wall thereof extending to the open end of said bore, a slip slidable in said groove, means for holding said slip therein, a spring in said passage interposed between said slip and an abutment at the upper end of said passage.

4. In a fishing tool, the combination of a socket having a bore formed therein, a passage formed at an angle to the axial line of said socket and intersecting the wall of the bore and forming a groove extending from its point of intersection to the open end of said bore, a slip slidable in said passage adapted to normally fill said groove, a pin for limiting the movement of said slip, a spring engaging the upper end of said slip, and a plug at the upper end of said passage confining said spring.

In testimony whereof, I the said VINCENT H. FRANCIS have hereunto set my hand.

VINCENT H. FRANCIS.

Witnesses:
KATHRYN FRANCIS,
J. H. HULME.